United States Patent [19]

Narasimhan et al.

[11] 4,214,226
[45] Jul. 22, 1980

[54] SYSTEM FOR PLOTTING SUBSOIL STRUCTURE AND METHOD THEREFOR

[75] Inventors: Keshavaiyengar Y. Narasimhan, Huntington Beach; Robert Nathan, Pasadena; Shakkottai P. Parthasarathy, Burbank, all of Calif.

[73] Assignee: The United States of America as represented by the Administrator of the National Aeronautics and Space Administration, Washington, D.C.

[21] Appl. No.: 830,846

[22] Filed: Sep. 6, 1977

[51] Int. Cl.² .................... G01V 1/12; G01V 1/20; G01V 1/34
[52] U.S. Cl. .................... 367/27; 181/102; 367/36; 367/57
[58] Field of Search ............ 181/106, 108, 116, 122, 181/113; 340/15.5 MC, 15.5 BH, 15.5 R, 15.5 DS, 5 MP; 73/598, 602, 625, 641

[56] References Cited

U.S. PATENT DOCUMENTS

| | | | |
|---|---|---|---|
| 2,276,335 | 3/1942 | Peterson | 340/15.5 MC |
| 2,792,067 | 5/1957 | Peterson | 340/15.5 MC |
| 2,900,037 | 8/1959 | Ellis | 340/15.5 MC |

OTHER PUBLICATIONS

Bois et al., "Well-to-Well Seismic Measurements," *Geophysics*, vol. 37, No. 3, Jun. 1972, pp. 471–480.
McDonal et al., "Attenuation of Shear and Compressional Waves in Pierre Shale," *Geophysics*, vol. 23, No. 3, Jul. 1958, pp. 421–439.

*Primary Examiner*—Howard A. Birmiel
*Attorney, Agent, or Firm*—Monte F. Mott; John R. Manning; Wilfred Grifka

[57] ABSTRACT

Data for use in producing a tomograph of subsoil structure between boreholes is derived by placing spaced geophones in one borehole, and if desired also on the earth surface, and by producing a sequence of shots at spaced apart locations in the other borehole. The signals, detected by each of the geophones from the various shots, are processed either on a time of arrival basis, or on the basis of signal amplitude, to provide information of the characteristics of a large number of incremental areas (pixels) between the boreholes. Such information is useable to produce a tomograph of the subsoil structure between the boreholes. By processing signals of relatively high frequencies, e.g., up to 1000 Hz, and by closely spacing the geophones, a high resolution tomograph can be produced.

5 Claims, 5 Drawing Figures

FIG. 2
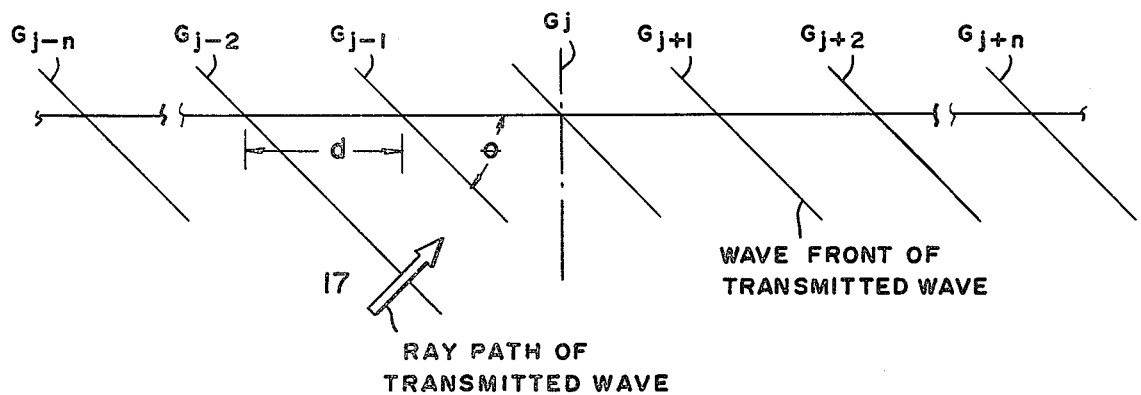
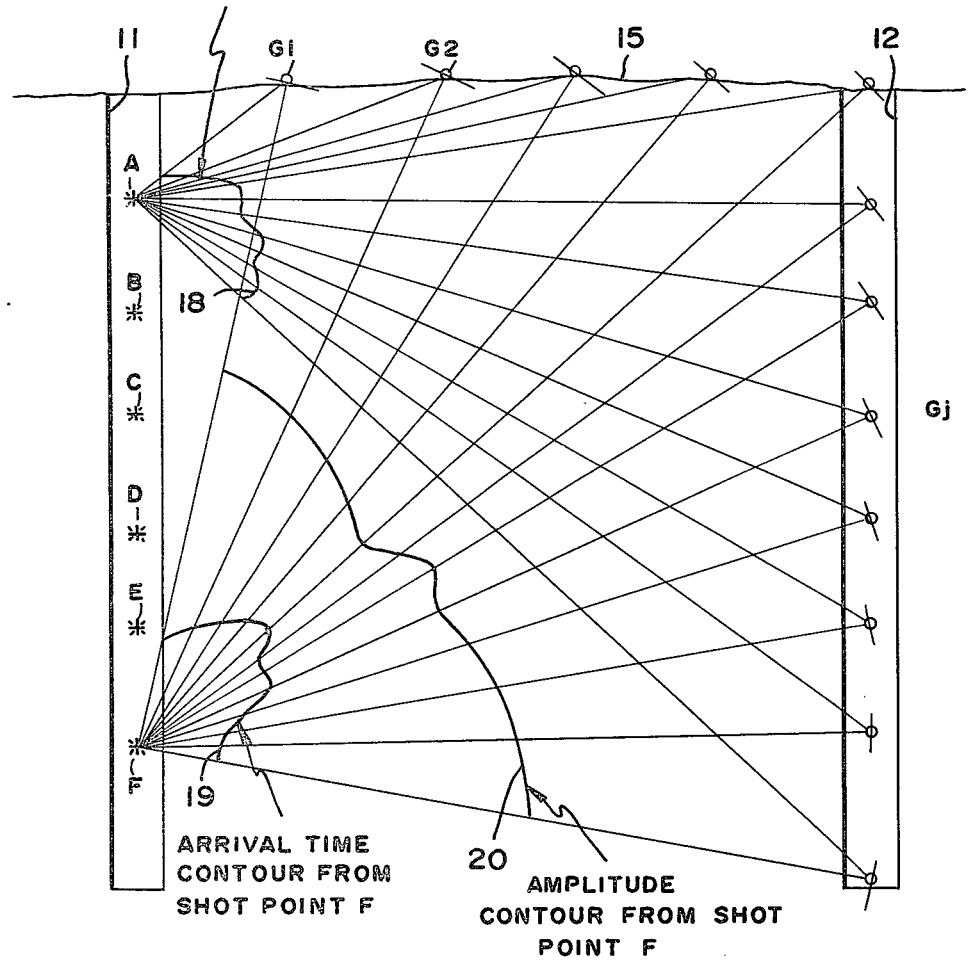
FIG. 3

SYSTEM FOR PLOTTING SUBSOIL STRUCTURE AND METHOD THEREFOR

ORIGIN OF INVENTION

The invention described here was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

1. Field of the Invention:

The present invention is directed to a system for and method of deriving subsoil structure data and, more particularly, to a system for and method of obtaining data to produce at least a two dimensional plot of subsoil structure, of relatively high resolution.

2. Description of the Prior Art:

Knowledge of the subsoil structure or stratigraphy, surrounding an existing borehole, even a dry hole, is useful in the selection of potential sites for oil well drilling. Knowledge of the stratigraphy is also useful in assessing potential reserves, and thereby aid in planning continued development of an oil field. Such knowledge would increase significantly if one were to have a multidimensional plot or graph of the subsoil structure, with sufficiently high resolution, capable of displaying the relative locations of both small and large structures and layers.

Herebefore, with prior art techniques only limited knowledge has been obtained of the subsoil structure. For example, information developed from logs and cores boreholes provides only localized data in the immediate vicinity of the holes. Only limited data is obtained from conventional seismic reflection measurements, made at the surface, since in many land areas it is difficult to determine the proper static corrections. Also, the weathered top layer near the surface greatly attenuates high frequency returns, particularly due to the two-way passage of the transmitted signals and reflected returns through the weathered layer. This impairs the resolution of data relating to deep features.

OBJECTS AND SUMMARY OF THE INVENTION

It is a primary object of the present invention to provide a system for obtaining data related to subsoil structure.

Another object of the invention is to provide a system for obtaining data related to subsoil structure from which a multidimensional graph of the subsoil structure can be produced.

Yet another object of the invention is to provide a method of deriving data of subsoil structure with reasonably high resolution.

A further object of the invention is to provide an improved method of deriving data of subsoil structure for producing a multidimensional graph thereof.

These and other objects of the present invention are achieved by producing a series of shots, at known, relatively closely spaced locations in a borehole, and receiving signals, transmitted from each of these shots through the subsoil structure cross-section of interest, at a plurality of detectors, known as geophones. All the geophones may be located at known locations in an adjacent borehole. If desired, some of the geophones may be located in the adjacent borehole and the rest on the surface, or all of them on the surface. Since the distance between each geophone and each shot location is known, based on the arrival times of the signals at the geophones or the received signals' amplitude, the received signals are processable to provide data, from which a multidimensional graph can be produced. Since the shots occur in a borehole rather than on the surface, even with some geophones on the surface, high frequency attenuation is greatly reduced. By reducing the spacings between shots and between geophones and with the high frequency signals, high resolution is obtainable, thereby enabling the production of a graph on which even small formations or layers are distinguishable from their surroundings. Briefly, the data obtained is processed, using the method developed in tomography, for reconstructing the features of the subsoil structure. As is known, tomography is the reconstruction of an object from a set of its projections, and is presently used in fields unrelated to subsoil structure plotting. For example, it is used in the field of medicine for observation of the structure of the tissue in the human body.

The novel features of the invention are set forth with particularity in the appended claims. The invention will best be understood from the following description when read in conjunction with the accompanying drawings.

BRIEF DESCRIPTION OF THE DRAWINGS

FIG. 2 is a diagram useful in explaining the times of arrival of a transmitted wave to spaced apart geophones;

FIGS. 3 and 4 are additional cross-sectional diagrams useful in explaining the invention.

DESCRIPTION OF THE PREFERRED EMBODIMENTS

Figure 1:
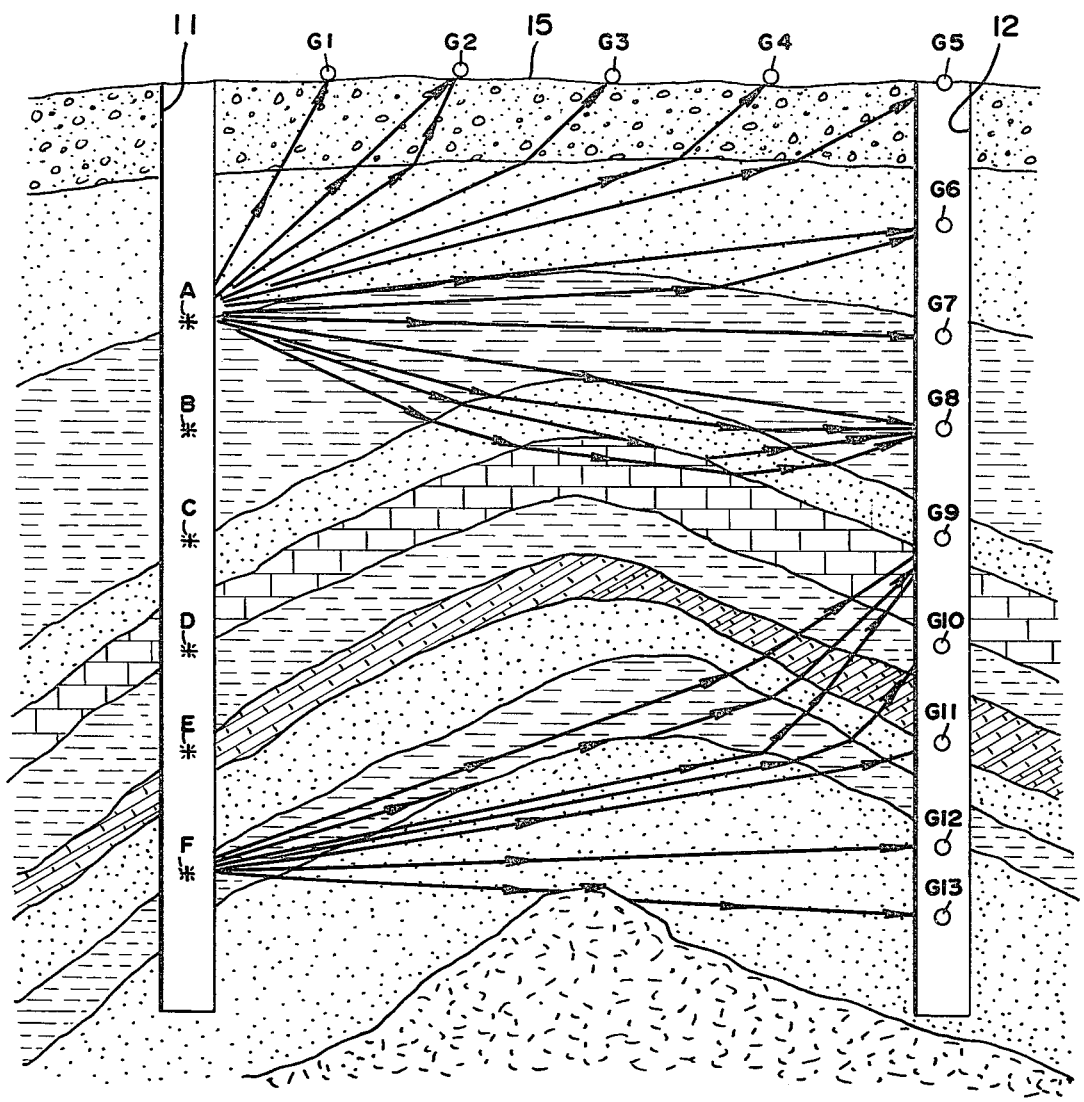
FIG. 1 is cross-section view of subsoil structure between boreholes, used to explain the basic principles of the invention.

Attention is now directed to FIG. 1 which is a cross-sectional view of subsoil structure between two spaced apart boreholes 11 and 12. The system and method of the present invention are directed to obtaining data for enabling the production of a graph or plot of subsoil structure, such as the structure which extends down from the earth surface 15 between the boreholes 11 and 12. In borehole 11, A-F represent shot points, or simply shots, at which explosives are detonated to cause signals or waves to be transmitted through the structure to detectors, known as geophones. In FIG. 1, thirteen geophones, G1-G13, are shown. Some geophones are located on the surface 15 and others in borehole 12. This arrangement is shown for explanatory purposes only. The number and spacings of the geophones may vary depending on the size of the structure to be plotted and the desired resolution. Also, all the geophones may be on the surface in case only one borehole is available, or all of them may be located in borehole 12. In fact, whenever the structure near the surface is not of interest, all geophones will be located in one borehole while all shots will be in another borehole. In FIG. 1 straight ray paths are shown from shots A and F only. Such rays may be assumed for a first approximation which can be improved by iterative techniques.

In general, the signals or data received at a geophone, e.g., G1, G2, etc., in the borehole 12 or on the surface 15 due to a shot, e.g., at A, will be a composite of the transmitted waves along AG1 or AG2, together with other waves, arriving at the geophones from a variety of possible ray paths. For instance, a wave from the shot point A can travel up the borehole 11 and on the surface 15 to geophone G2. However, with the knowledge of the depth of shot point in borehole 11 and the relative locations of the geophones, either in borehole 12 and/or on surface 15, the ray path of the transmitted wave can be identified. Hence, the records, obtained from consecutive geophones, can be processed to identify the transmitted waves along AG1, AG2, etc..

The method of processing to identify the transmitted wave along an assumed ray path will be explained in conjunction with FIG. 2 as follows.

The direction of the transmitted wave, arriving at the location of a geophone, generally designed as $G_j$ and the neighboring geophones, equally spaced on either side of $G_j$, is designated in FIG. 2 by 17. Since the ray path of the transmitted wave is known from the relative positions of the shot point and geophone $G_j$ the angle $\theta$ between the line of geophones and the wave front of the transmitted wave can be determined. Assuming that the geophones are equally spaced at a distance d around $G_j$, the time delay of arrival at consecutive geophones of the transmitted wave under consideration can be determined and is given by $$\Delta t = d \sin \theta / V_{eff} \quad (1)$$

where $V_{eff}$ is the effective wave velocity. Thus, if the arrival time of the transmitted wave at geophone $G_j$ is $t_o$, then the geophones $G_{j-1}, G_{j-2}...G_{j-n}$ will receive the transmitted wave earlier at time $t_o - \Delta t, t_o - 2\Delta t ... t_o - n\Delta t$. The geophones $G_{j+1}, G_{j+2}...G_{j+n}$ will receive the wave at $t_o + \Delta t, t_o + 2\Delta t ... t_o + n\Delta t$ respectively. Hence, the transmitted wave at the geophone $G_j$ can be identified by stacking the records of geophones $G_{j-1}, G_{j-2}...G_{j-n}$ with a time delay of $\Delta t, 2\Delta t...n\Delta t$ with respect to record of geophone $G_j$, and also stacking the records of geophones $G_{j+1}, G_{j+2}...G_{j+n}$ with a time advance of $\Delta t, 2\Delta t...n\Delta t$ with respect to the record at $G_j$. Thus, the arrival time $t_o$ and the amplitude of the transmitted wave under consideration at $G_j$ can be determined.

It should be pointed out that with the above method of processing the wave, arriving at a geophone in a particular direction, will be singled out and enhanced, while the waves arriving at the geophone from other directions will cancel. Further such a method of processing can be generalized to recover waves arriving at a geophone from various directions and is applicable even to the case when two waves arrive at a geophone simultaneously. Further, this method of processing is applicable in general and is not necessarily confined to the downhole acoustic technique.

Attention is now directed to FIG. 3. From the foregoing it should be appreciated that the arrival time and amplitudes of the transmitted waves along the various ray paths AG1, AG2...AGj to geophones $G_{j+1}, G_{j+2}...G_j$ due to shot A can be determined. In FIG. 3 the corresponding arrival contour times of the waves at the geophones due to shot A is designated by 18. Likewise, the arrival time and amplitude contours due to shot F are designated by 19 and 20, respectively. This procedure can be repeated for various shot locations A, B, C etc.. Similar results can be obtained for shots in the borehole 12 with geophones located in the borehole 11 and on the surface 15. From these results and with the method of processing, suggested here, to identify the transmitted wave along a ray path, it should be apparent that, with the aid of tomographic principles, the details of the subsoil structure between the two boreholes 11 and 12 can be reconstructed and plotted.

Figure 4:
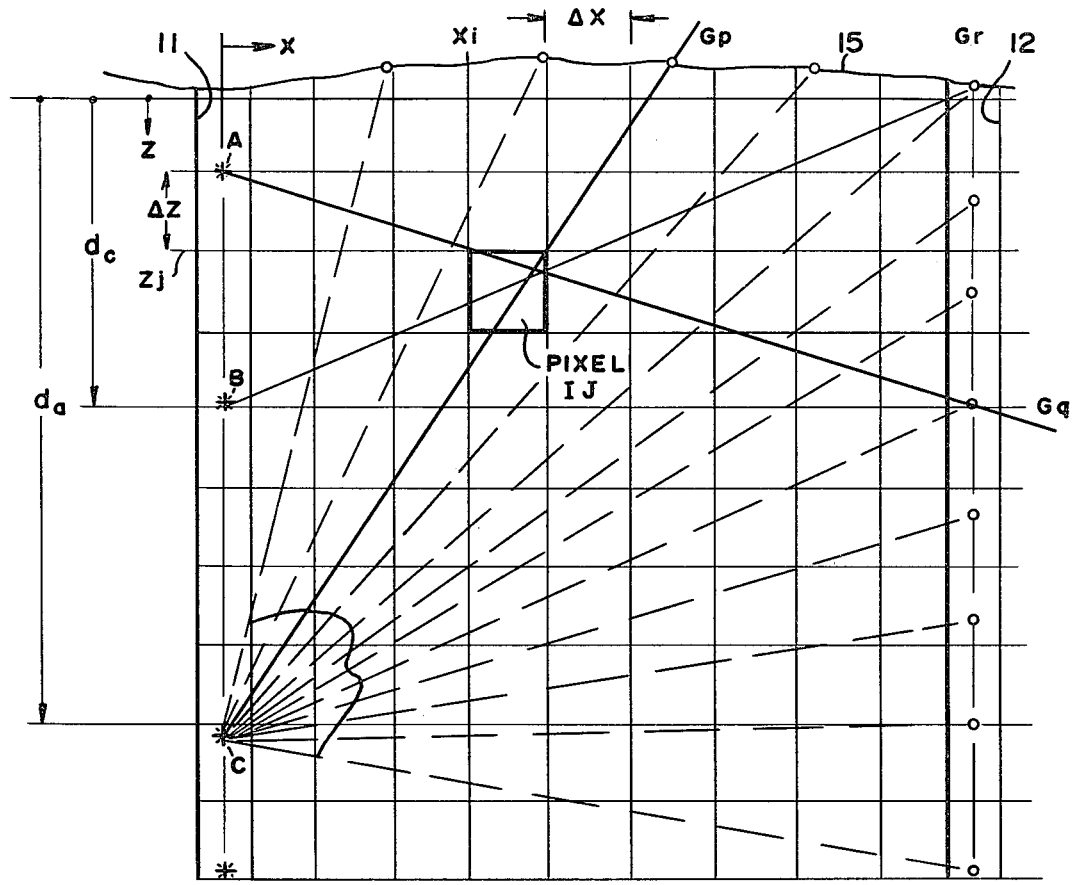

For the purpose of demonstrating the method of tomographic reconstruction, consider the arrival times of the transmitted wave at various geophones due to the various shots in the two boreholes. The two dimensional cross-sections between the two boreholes 11 and 12 may be divided into a number of rectangular regions and their coordinates with respect to a cartesian coordinate system X Z can be identified, as shown in FIG. 4. Each rectangular region or pixel is intercepted by a number of transmitted wave ray paths from various shot points to geophone locations.

For purposes of illustration three transmitted wave ray paths from shot points A, B and C to the geophones $G_p, G_q, G_r$ respectively, intercepting the pixel I J, are shown in FIG. 4. If the times of arrival of the transmitted wave from shots A, B and C to the geophones $G_p, G_q, G_r$ are given by $t_{ap}, t_{bq}$ and $t_{cr}$, one can derive $$t_{ap} = \sum_{ij} t_{ij} \cdot \omega_{ijap} \quad (2)$$

$$t_{ij} = (\Delta X \cdot \Delta Z / V_{ij}^2)^{\frac{1}{2}} ; \omega_{ijap} = [l_{ijap}^2/(\Delta X \cdot \Delta Z)]^{\frac{1}{2}} \quad (3)$$

where
$\Delta X$ pixel length in X direction
$\Delta Z$ pixel length in Z direction
$V_{ij}$ transmission velocity in pixel I J
$l_{ijap}$ length of intercept with pixel I J of the transmitted ray from shot point A to geophone $G_p$
and the summation i j is carried over all pixels, intercepted by the transmitted ray path. Similarly, one can derive $t_{bq}$ and $t_{cr}$ from the following relationships:

$$t_{bq} = \sum_{ij} t_{ij} \cdot \omega_{ijbq} \quad (4)$$

$$t_{cr} = \sum_{ij} t_{ij} \cdot \omega_{ijcr} \quad (5)$$

Similar equations can be written for all the pixels in the cross-section between the boreholes 11 and 12 and for the transmitted ray paths between the various shot points and geophones. Solution of these equations for all $t_{ij}$ yields the "time picture" of the geological cross-section between the two boreholes.

Various methods are currently available for obtaining the solution of the stated simultaneous equations. The algebraic reconstruction technique among them seems to be particularly suited to the present problem, since the requirements for storing the data for processing will be minimized and this method also has a relatively rapid rate of convergence. A technique for solving the simultaneous equations is described by Z. H. Cho in an article entitled "General Views on 3-D Reconstruction and Computerized Transverse Axial Tomography", *IEEE Transactions on Nuclear Science*, Vol NS-21, June 1974, pages 44–71. An algebraic reconstruction technique is described by R. Gordon in "A Tutorial on Art", *IEEE Transactions on Nuclear Science*, Vol NS-21, June 1974, pages 78–93.

One variant of the algebraic reconstruction technique is the following iteration procedure. In equation (2) $t_{ij}$ represents a time delay, depending on the velocity of transmission of the material in pixel I J, and $\omega_{ijap}$ can be considered as a weighting factor. Equation (2) expresses the fact that the weighted sum of the time delays of all the pixels, intercepted by ray $AG_p$ is equal to the arrival time of the transmitted ray at geophone $G_p$. Hence, at any step in the iteration, the weighted sum of the time delays of all the pixels, intercepted by a given ray path, say $AG_p$, can be compared with the arrival time $t_{ap}$.

In general, the two quantities will differ. If $$\epsilon_{ap}^n = [t_{ap} - \sum_{ij} t_{ij}^n \cdot \omega_{ijap}]; \text{ and } \epsilon_{ap}^n > \epsilon_o, \quad (6)$$

where $\epsilon_o$ is a predetermined error bound and $\epsilon_{ap}^n$ is the error in the ray path $AG_p$ on the $n^{th}$ iteration, then one can take $$t_{kl}^{n+1} = t_{kl}^n + \epsilon_{ap}^n [\omega_{klap}/(\sum_{ij} \omega_{ijap})] \quad (7)$$

This procedure can be repeated for all the ray paths, until $\epsilon_{ap}^n > \epsilon_o$.

Herebefore equations were presented to obtain a "time picture" from which the subsoil structure cross-section can be plotted. It should be appreciated that one can obtain an "amplitude picture" of the cross-section. In each of the above equations time, t, may be replaced by signal amplitude, a. With either or both pictures, the locations of structures of interest even small structure, e.g., oil reservoirs, can be determined quite accurately.

It is of interest to note some of the advantages of tomograhic mapping, utilizing borehole to borehole or borehole to surface acoustic techniques. One of the major problems in the current reflection seismic processing on land is the presence of near surface inhomogeneity of the weathered layer, leading to the requirement of the ambiguous "static corrections." Also, due to the weathered layer, high frequency signals are highly attenuated. Thus, typically only low frequencies, e.g., 100 Hz or less, are processed. This greatly reduces the resolution, since structure definition is limited to not more than $\frac{1}{2}$ $\lambda$, where $\lambda$ is the wavelength.

This problem largely disappears with the method of the present invention, particularly when all geophones are in a borehole and not on the surface. In such a case the detected waves do not propogate through the weathered layers. Thus, higher frequencies, which are not subject to large attenuation can be used. For example, frequencies on the order of 1000 Hz (1kHz) can be analyzed, thereby enabling the production of a tomograph with considerably high resolution. Even when some geophones are placed on the surface 15 the waves travel through the weathered layer only once, thereby leading to much less noise than the double pass through the weathered layer required in current reflection seismic processing. Further, by firing shots alternately in each borehole and recording signals from geophones in each borehole and on the surface the problem of "static" due to the near surface weathered layer is minimized, if not entirely removed, and the additional expense may be fully justified. In fact, the pictures obtained below the weathered layer are least affected by the presence of the weathered layer and this aspect is of major significance in borehole to borehole tomography.

It is acknowledged that a prior art article discloses well-to-well seismic measurement. This article, by P. Bois et al, entitled "Well-To-Well Seismic Measurements" appeared in *Geophysics*, Vol, 37, No. 3, June 1972, pages 471–480. The main purpose of the teachings, disclosed in this article is to obtain information of the elastic properties of reservoirs. More particularly, the objective was to locate buried structures. As clearly apparent from the teaching on page 472, therein only signals at relatively low frequencies of about 100 Hz or less are processed. This is indicated by the fact that a high cut-off filter was used to attenuate all undesirable high frequencies. As also stated therein, the disclosed method can only "detect major structural events, but it cannot detect fine heterogeneities between wells."

Unlike the prior art, in accordance with the present invention much higher frequency signals are processed, e.g., several hundred Hz and preferably up to about 1000 Hz. Thus, much higher resolution is obtainable with the present invention. Also, the present invention is directed to processing data to produce a tomograph, i.e., a multidimensional graph of a cross-section of the subsoil structure with fine resolution, so that small structural discontinuities and layers can be identified and not merely to locate and detect only a major structural event.

The following table highlights the advantages of using higher frequencies to obtain higher resolution. Therein the following are assumed:

(a) an average velocity of the geological medium of 3000 m/sec.;

(b) $\lambda$ or wavelength is in meters;

(c) f is in Hz;

(d) $D = 100\lambda$ and is distance in meters between boreholes;

(e) 300 pixels between boreholes;

(f) n is the vertical dimension of the cross-section to be plotted; and (g) each pixel (in meters) is a square with a side dimension of $\lambda/3$.

| Def. | f 100 | 200 | 500 | 1000 |
|---|---|---|---|---|
| $\lambda$ | 30 | 15 | 6 | 3 |
| D | 3000 | 1500 | 600 | 300 |
| Pixel Size | 10 | 5 | 2 | 1 |

The spacings between geophones should preferably be equal to the pixel size. The total number of geophones would of course depend on the depth. The number of shots should be chosen to provide sufficient rays to pass through each pixel. It is believed that 20–30 shots may be sufficient to provide sufficiently high resolution even with a pixel size of $1 \times 1$ meters when signals at 1000 Hz are processed.

From the foregoing it should be apparent that when processing higher frequency signals the pixel size decreases, and therefore higher resolution is attainable. Assuming that 1000 Hz signals are processed and n = 300m, and further assuming that geophones are placed in one borehole as well as on the surface, for a pixel size of $1 \times 1$m, $300 + 300 = 600$ geophones would be required. With 30 shots the total amount of data is equal to $600 \times 30 = 18,000$ records. Such an amount of data is storeable in presently existing data storage devices and processable with known data processors. The results of such processed records would be a graph of $300m \times 300m$ with a pixel resolution down to $1 \times 1m$. This is clearly unattainable when low frequency signals, e.g., 100 Hz or less, are processed as taught in the prior art.

Figure 5:
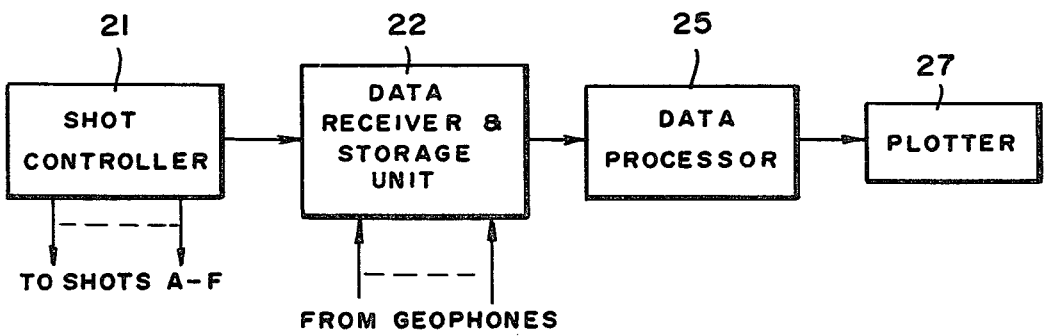
FIG. 5 is a block diagram of an arrangement for practicing the invention.

The manner of detonating shots, receiving signals from geophones and processing such signals (data) are well known in the geophysical art and, therefore, they will be described herein in detail. In FIG. 5 numeral 21 represents a shot controller which may be used to sequentially detonate each of the shots A–F. It may be manually controlled to control the time each shot detonation takes place. When a shot is detonated a signal is also sent by controller 21 to data receiver and storage unit 22 to indicate therein the instant each shot takes place so that the arrival times of the signals from the various geophones can be related to the shot time. After all the shots have occurred the data records stored in unit 22 may be supplied to data processor 25 for processing. The latter is assumed to process the data, based on the relationships herebefore discussed and based on known tomographic processing techniques.

As previously pointed out, processing may be based on signal arrival time to provide a "time picture" or based on signal amplitude to provide an "amplitude picture". The output from processor 25 may be supplied to a plotter 27, e.g., an XY plotter to produce a two dimensional plot, i.e., a tomograph of the subsoil structure between the boreholes.

Although particular embodiments of the invention have been described and illustrated herein, it is recognized that modifications and variations may readily occur to those skilled in the art and consequently, it is intended that the claims be interpreted to cover such modifications and equivalents.

The embodiments of the invention in which an exclusive property or privilege is claimed are defined as follows;

1. In a method for obtaining relatively high resolution information of the subsoil structure between two spaced apart boreholes, the steps comprising:
   placing a plurality of signal sources at preselected distances from one another in one borehole;
   placing a plurality of signal detectors at preselected distances in at least the second borehole;
   activating each of said sources in a selected sequence;
   receiving at each of said detectors, signals which propagate to said detectors through said subsoil structure as a result of each activated source; and
   processing the signals received at each detector as a result of the activation of said sources, including signals at frequencies greater than 160 Hz to obtain data adapted to produce subsoil structure information of incremental areas on the order of $(\lambda/3)$ for producing a tomograph of the substructure between said boreholes, where $\lambda$ is the wavelength of processed signals.

2. A method as described in claim 1 wherein $\lambda$ is on the order of not more than 20 meters.

3. A method as described in claim 2 wherein the number of activated sources is on the order of not less than 20.

4. A method as described in claim 1 where said detectors are spaced apart a distance of about x meters where x is the side dimension of the area of desired resolution.

5. A method as described in claim 1 wherein signals of frequencies of 100n are processed to obtain said high resolution wherein n is on the order of 10 and said detectors are spaced apart a distance less than $\lambda$.

* * * * *